H. L. BOYER.
CAMERA.
APPLICATION FILED JUNE 19, 1915.
1,305,585.
Patented June 3, 1919.
6 SHEETS—SHEET 2.
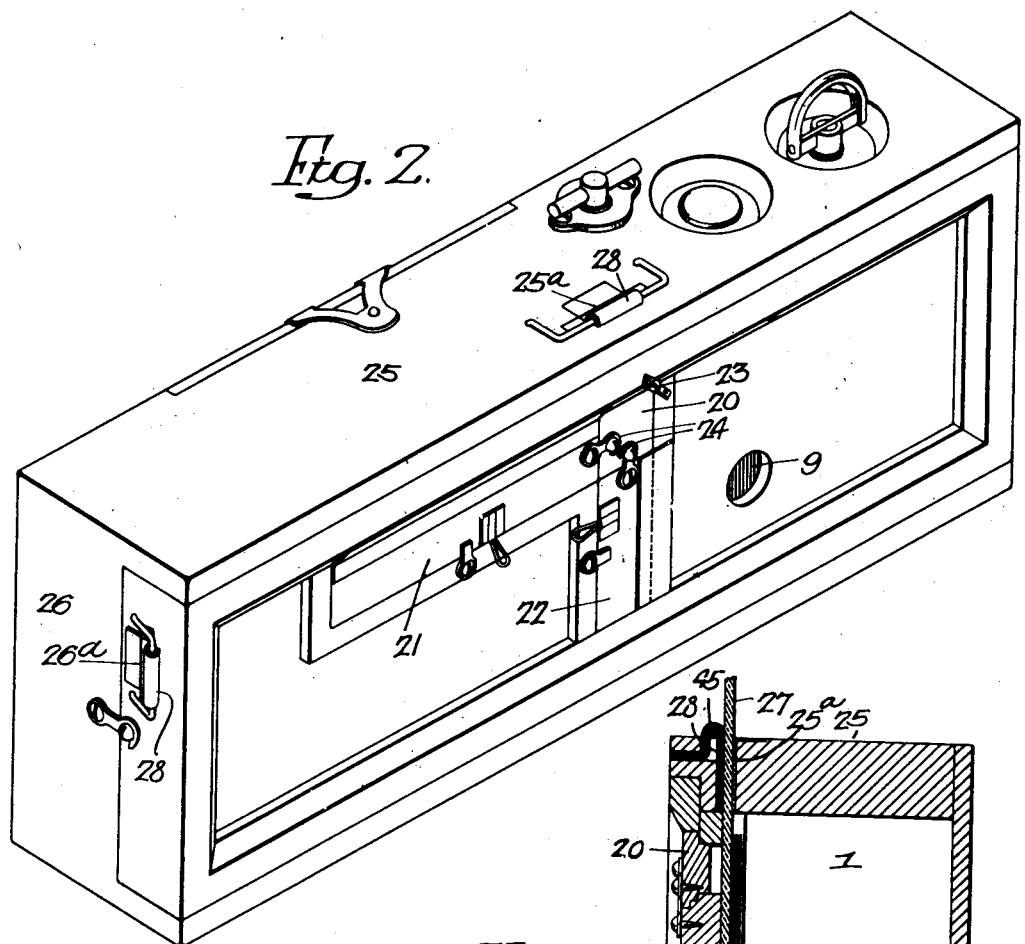
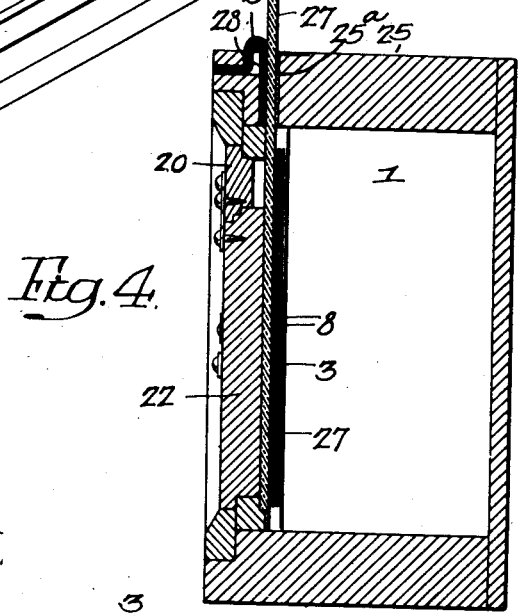
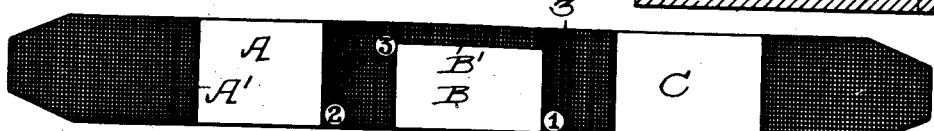
Inventor:—Harvey L. Boyer
by his Attorneys

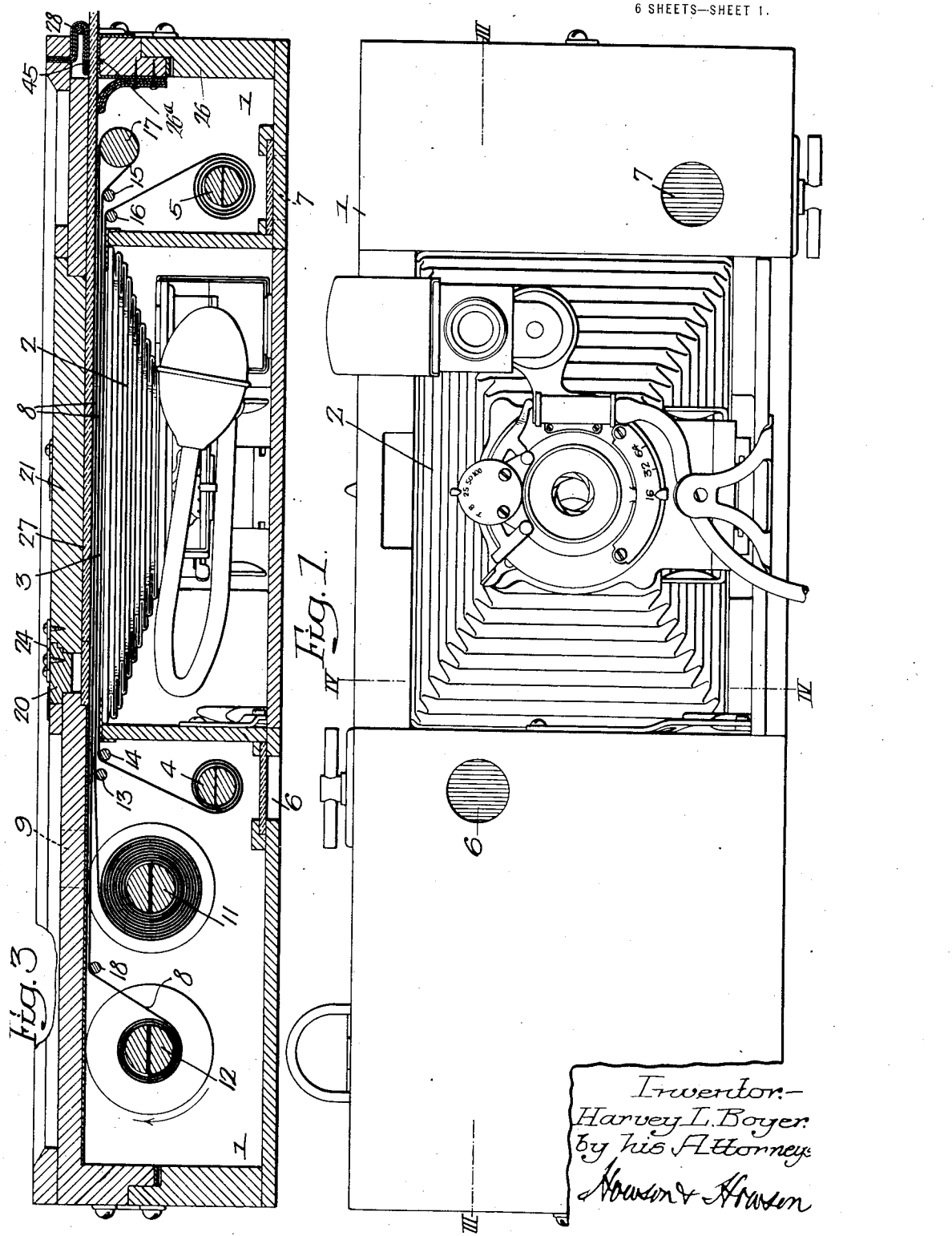

H. L. BOYER.
CAMERA.
APPLICATION FILED JUNE 19, 1915.

1,305,585.

Patented June 3, 1919.
6 SHEETS—SHEET 3.

Inventor.
Harvey L. Boyer
by his Attorneys
Howson & Howson

H. L. BOYER.
CAMERA.
APPLICATION FILED JUNE 19, 1915.

1,305,585.

Patented June 3, 1919.
6 SHEETS—SHEET 4.

Inventor—
Harvey L. Boyer.
by his Attorneys—

H. L. BOYER.
CAMERA.
APPLICATION FILED JUNE 19, 1915.
1,305,585.
Patented June 3, 1919.
6 SHEETS—SHEET 5.
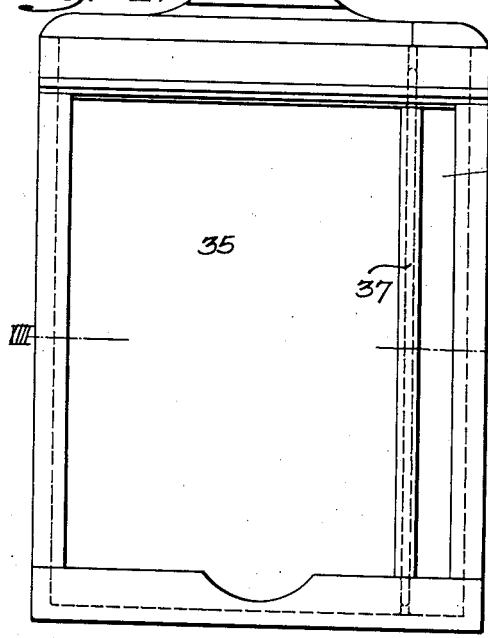
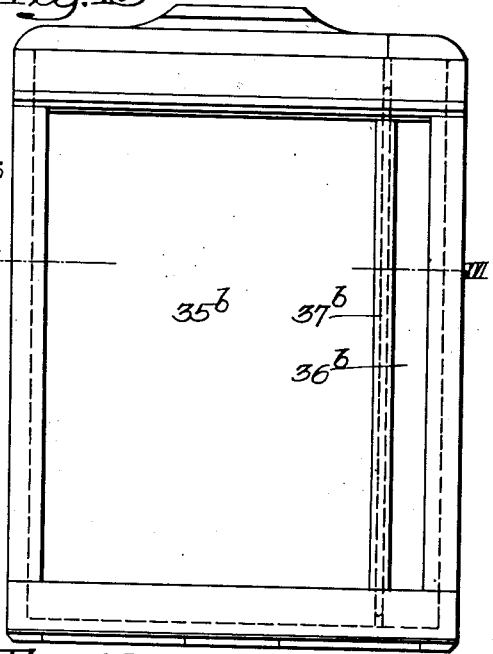
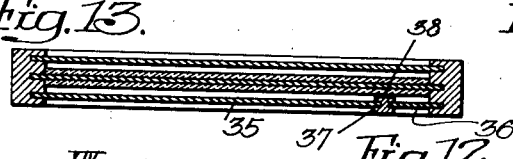
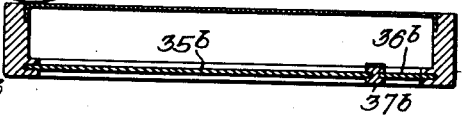
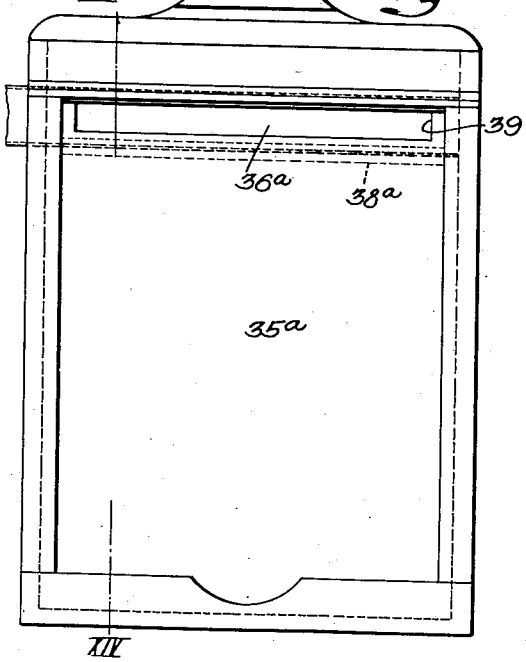
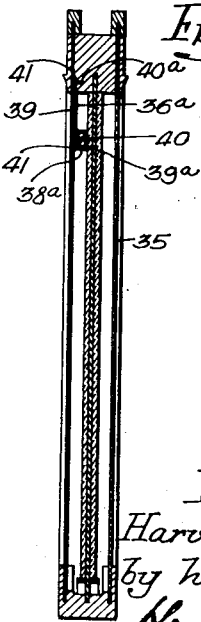
Inventor—
Harvey L. Boyer.
by his Attorneys.
Howson & Howson

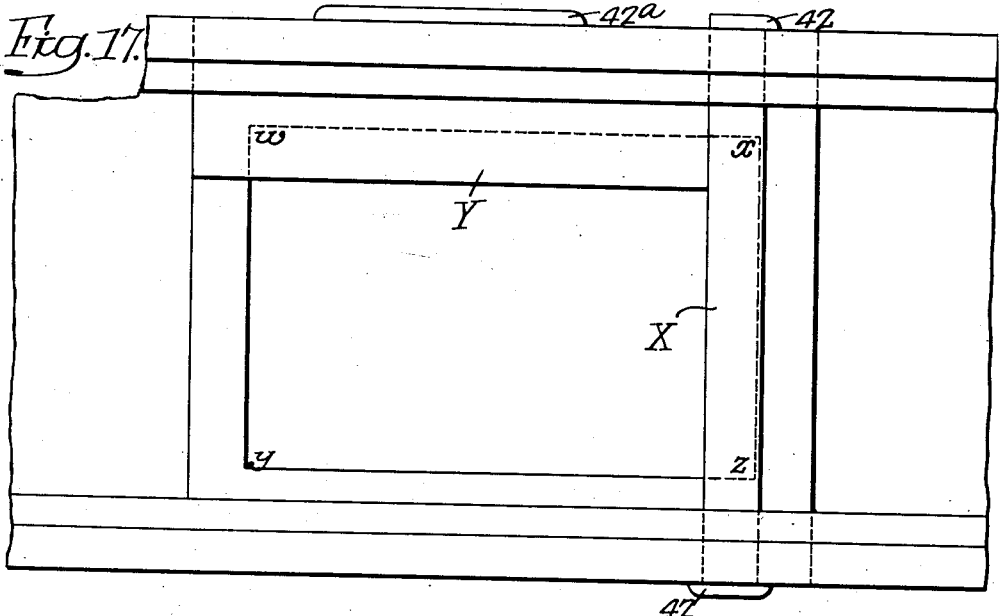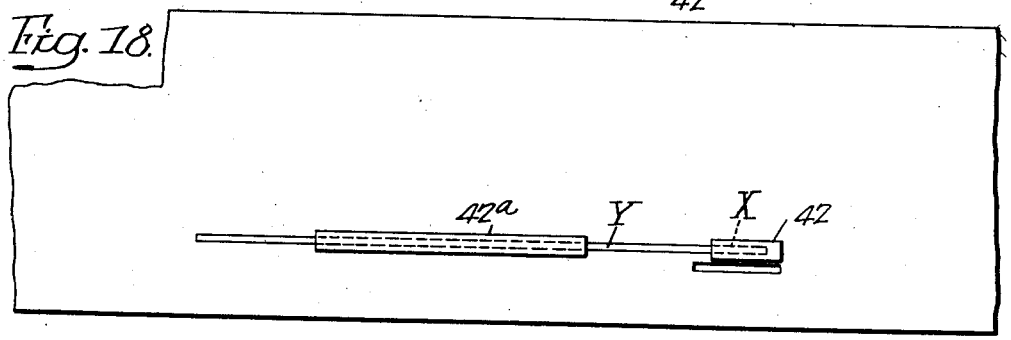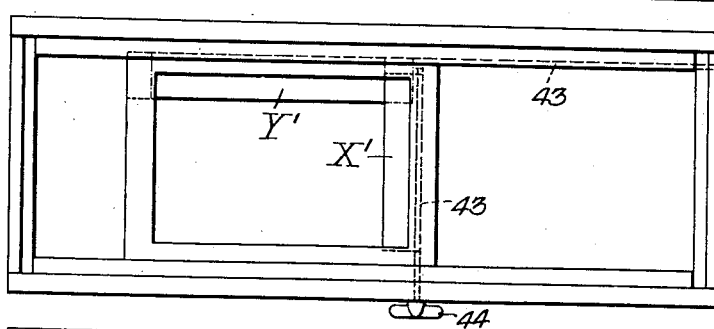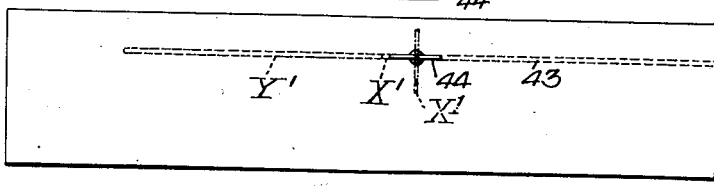

UNITED STATES PATENT OFFICE.

HARVEY L. BOYER, OF PHILADELPHIA, PENNSYLVANIA.

CAMERA.

1,305,585.　　　　　Specification of Letters Patent.　　Patented June 3, 1919.

Application filed June 19, 1915. Serial No. 35,047.

*To all whom it may concern:*

Be it known that I, HARVEY LEWIS BOYER, a citizen of the United States, residing in Philadelphia, Pennsylvania, have invented certain Improvements in Cameras, of which the following is a specification.

My invention relates to cameras; and the object of my invention is to provide the various forms of cameras using plates and films, whether film packs or roll films are employed, with means whereby a title or other identifying matter may be displayed directly upon the film or plate at or about the time the picture is taken; that is to say, at the time the film or plate is exposed for the reception of a picture to be subsequently developed and printed.

My invention involves the idea of protecting or preserving a portion of the exposure surface of the film or plate and of printing the title or other identifying matter directly upon such protected portion of the film or plate after the main exposure has been made; such printing being effected by inserting within the camera or other carrier and over the exposure surface of the film or plate a suitable transparent or translucent plate, strip or film containing the title, and opening a portion of the camera to permit light to pass through such plate strip or film in order that the title may be printed upon the previously protected portion of the plate or film having the exposure to be identified. Various means of accomplishing this result in connection with roll film cameras, film pack cameras, film plate adapters and plate holders for plate cameras are shown in the accompanying drawings, in which:

Figure 1, is a front elevation of a roll film camera to which my improvements have been applied;

Fig. 2, is a perspective view showing a rear elevation of a roll film camera made in accordance with my invention;

Fig. 3, is a sectional plan view on the line III—III, Fig. 1;

Fig. 4, is a vertical sectional view on the line IV—IV, Fig. 1;

Fig. 5, is a plan view extended of the curtain employed in the form of camera shown in Figs. 1, 2, et seq.

Fig. 11, is a front elevation of a plate holder for use in an ordinary plate camera having features forming the subject of my invention;

Fig. 12, is a rear elevation of the said plate holder;

Fig. 13, is a cross sectional view on the line XIII—XIII, Fig. 11;

Fig. 14, is a vertical sectional view on the line XIV—XIV, Fig. 12;

Fig. 15, is a view similar to Fig. 11, of a film pack adapter to which my invention may be applied;

Fig. 16, is a sectional view on the line XVI—XVI, Fig. 15;

Fig. 17, is a rear elevation, partly in section, showing a modified form of shutter or shield for the exposure surface of the film;

Fig. 18, is an inverted plan view of the same;

Fig. 19, is a view similar to Fig. 17, of another form of shutter arrangement, and Fig. 20, is an inverted plan view of the same.

Figure 6:
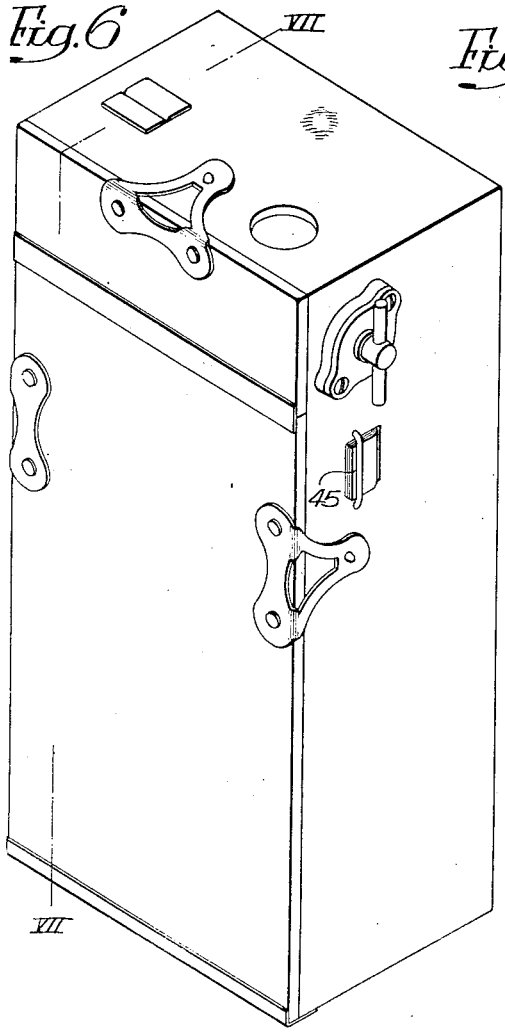
Fig. 6, is a perspective view of a film pack camera to which my invention has been applied.

The principle upon which my invention is based is the provision of means for temporarily stopping or protecting a portion of the sensitized exposure surface of the respective films, plates, &c., which portion may subsequently have the title printed thereon by exposing such protected portion of the film to light which will pass through a suitable transparent or translucent medium upon which the title or other indicating or identifying matter is written, printed, or otherwise displayed.

In carrying my invention into effect in connection with a roll film camera, certain modifications in the construction of the same are desirable in order that it may be properly employed for such purpose.

In Figs. 1 and 2, I have shown one form of roll film camera to which my invention has been applied. In this camera, 1 represents a casing having the usual light receiving chamber 2. At the back of this chamber I interpose a movable curtain 3 carried by independent rolls 4 and 5 whereby it may be turned in both directions; said rolls being further provided with means whereby they are tightly held to insure the maintenance of said curtain in a taut condition. This curtain is provided with certain opaque and transparent portions divided into three zones or spaces and identified by the characters, ①, ② and ③, which are viewable through properly screened apertures 6 and 7 at the front of the camera.

The transparent portions of the various zones or spaces of the curtain 3 are indicated at A, B and C, and the opaque portions of the spaces A and B, are indicated at A' and B'. The opaque portion A' is for the purpose of overlying and protecting a portion of one of the sensitized film units at its end so that the title may be printed upon the shorter side of the negative, while the opaque portion B' is designed to overlie and protect a portion of one of the sensitized film units on the long side of the same so that the title may be printed thereon. The transparent portion C of the curtain 3 is the full size of a film unit so that the exposure upon the same will cover the full extent of the film, and is for use when there is no object or desire to display a title.

While I have shown a curtain as the means providing opaque stopping portions, and transparent portions through which an exposure may be made, it will be understood that I may provide a curtain having opaque portions only, with apertures for the exposures so as to avoid the interposition of any light modifying medium between the lens and the film.

In using a film of the roll type, I have modified the arrangement or disposition of the same in order to render the camera available for printing the titles upon the film units, and to this end the film, indicated at 8, is carried back to a receiving spool over the portion which is in position for exposure; the previously exposed portion being then positioned to be brought to a second printing point where it may be exposed to a translucent or transparent member carrying the title or any other desired indicating matter.

In order that the film may be properly positioned for this purpose, it is provided with its indicating numerals to define the exposure units on the exposure side thereof which are adapted to show through a properly covered aperture 9 in the back wall of the camera, and the relation of these indicating numerals to the film units is such that when film unit No. 2, is positioned for exposure, and the numeral 2 shows at the viewing aperture 9, film unit No. 1, is in position to receive the title or other identifying matter to be printed thereon, at either side thereof, depending upon the portion of the exposure surface which has been protected by the curtain 3.

In order that the film, indicated at 8, may be carried in this manner, I provide rollers 11 and 12, as clearly indicated in Fig. 3 of the drawings; the film being started from the roller 11, brought first over guide rollers 13 and 14, then over guide rollers 15 and 16, around an idler roller 17, and then returned over the back of its previously extended film portion and the roller 11, and an idler or guide roller 18, to the roller 12, upon which it is wound, after the several film units have been exposed. The camera is then ready for the exposure of the film units in regular order.

In order that the title may be printed upon the unexposed sections or portions of each film unit that have been left so as to permit such printing, the back is provided with apertures closed by light excluding doors. These doors are three in number and comprise a corner door 20, and supplemental doors 21 and 22 extending at right angles in two directions from said corner door, and with which said corner door may be combined to make a full opening at the desired times. For this purpose the corner door is provided with a single ball hinge 23 so that it may move in two directions without difficulty, as when coupled to either of the other doors. These doors are provided with flanged edges or rabbets, and the corner door is provided with edges to match the same so that when the whole structure is closed a complete light excluder is provided. In order that the doors may be connected together, suitable catches or hooks 24 are provided whereby the corner door may be independently connected to either of the other doors. By this means openings of the full length, and width, of the film may be made to permit printing of the title, and avoid the presence of a dark spot upon the finished picture.

The side and end walls 25 and 26 of the camera are provided with apertures or openings 25ᵃ and 26ᵃ for the insertion of translucent sheets or plates 27 carrying a title or other identifying matter; such openings having spring-pressed closures 28 which will yield under the pressure exerted by the printing member when the latter is inserted, and after the printing member is inserted in proper position to insure the disposal of the title in proper relation with respect to the film, the door overlying such printing element is opened momentarily to the light, and the result of this action will be the printing of the title upon the film in the proper position.

In the form of film pack camera shown in

Figure 7:
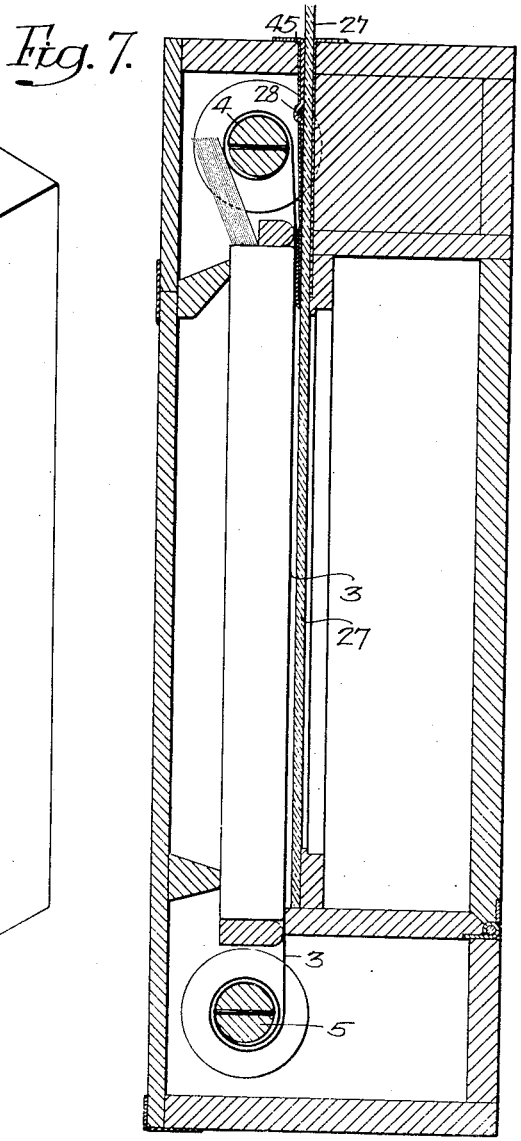
Fig. 7, is a vertical sectional view of the same on the line VII—VII, Fig. 6.
Figure 8:
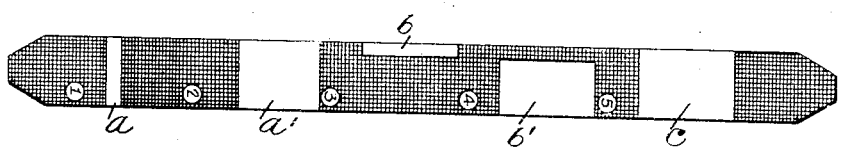
Fig. 8, is a view extended on a reduced scale of the curtain employed with the form of camera shown in Figs. 6 and 7.

Figs. 6, 7, 8, &c., a curtain similar to that illustrated in Fig. 1 is employed, having the various portions—opaque and transparent, and in addition such curtain carries transparent and opaque portions which are employed when the title is being printed; the respective portions being indicated at $a$, $a'$, $b$, $b'$ and $c$, and identified by the characters ①, ②, ③, ④ and ⑤. The camera is operated in the ordinary manner; the films being pulled around after they have been exposed. Prior to removal or transference of the film, however, when it is desired to print a title, the curtain is rolled so as to bring the portion having the narrow transparent space corresponding to the protective strip which has been disposed opposite the film that has been exposed, into position; then the title carrying member is inserted either longitudinally or crosswise, as the case may be, the camera held to the sky, and the lens shutter worked to permit exposure; then the film may be transferred to the back as in ordinary film pack cameras.

Figure 9:
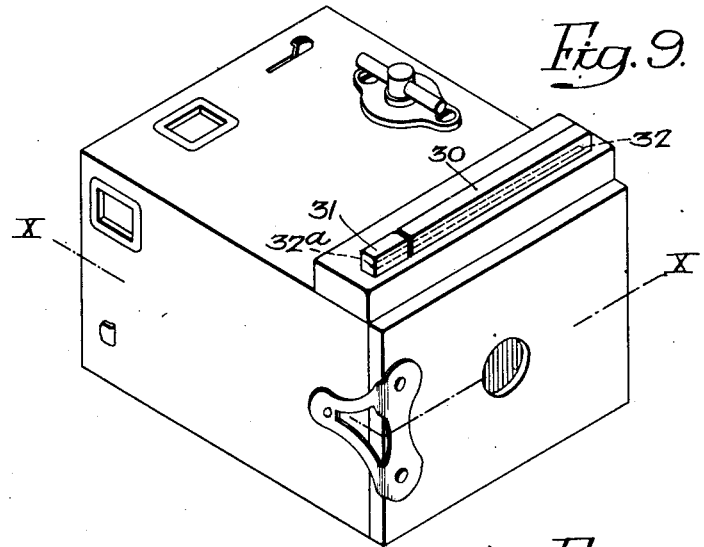
Fig. 9, is a perspective view of a box roll camera to which my invention has been applied.
Figure 10:
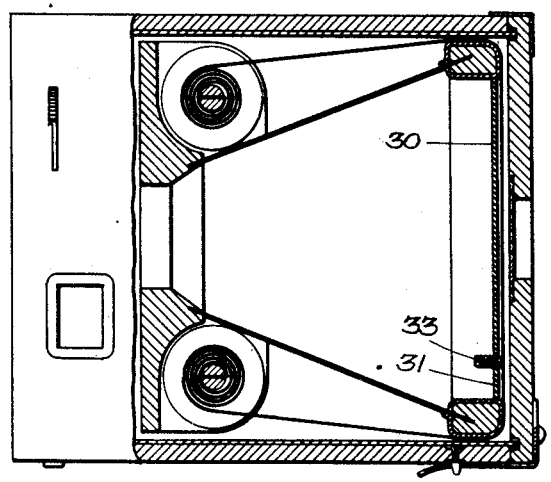
Fig. 10, is a sectional plan view on the line X—X, Fig. 9.

In the use of my invention with cameras of the type shown in Figs. 9 and 10, I provide the camera with a pair of shutters 30 and 31, adapted to overlie the exposure face of film; one of said shutters, 30, being of substantially the full width, while the other shutter, 31, is narrower and, with the aid of the shutter 30 makes up the full width of the film. These shutters are arranged to be inserted in the through slots 32 and 32ª, and to overlie the receptive or exposure face of the film; the larger shutter covering a space designed to receive the picture, while the smaller shutter covers the space to receive the title.

In practice after the camera is loaded, the shutters are set in place, and when it is desired to make an exposure the large shutter 30 is pulled out, leaving the small shutter 31 in place. After this exposure, the large shutter 30 is restored, then the small shutter 31 is removed, and the plate or strip of translucent or transparent material carrying the title is inserted, the camera turned toward the sky, and the shutter opened for slight exposure. Then the title carrying element is removed, the small shutter 31 is restored to its place, and the film is then moved to bring the next exposure unit in proper position to receive another picture, and the same operation may be repeated.

By preference a division member 33, having a cushion surface, is placed between the two shutters, which member is arranged to contact with the sensitized surface of the film, and tightly engage the shutters so that both portions of the film will be protected and the unexposed portion concealed by the small shutter when the main exposure is made will be perferectly clear and in proper order to receive the title of the picture.

When employing my improved construction with a plate holder, as shown in Figs. 11, 12, 13 and 14, I provide one side of the same with two shutters 35 and 36, and the other side with shutters 35ª and 36ª; the shutters 35 and 35ª being wide, and the shutters 36 and 36ª being narrow. The shutter 36 provides a space for the title on the long side of the plate, while the shutter 36ª provides a space on the short side or end of the plate. On the side of the plate holder having the shutters 35 and 36, a narrow dividing strip 37 is provided having guiding grooves so that the shutters can be readily pushed in and drawn out without marring the plate, and said dividing strip is provided with a cushion face 38 in contact with the exposure face of the plate and fully closing the space between the shutters so that when the plate is exposed, upon removal of either shutter, there will be no danger of blurring either portion of the same.

As is well known, the shutters are entered and withdrawn from the ends of the plate holders, and in providing means for the printing of the title upon the short end of the plate it is necessary to aperture the shutter 35ª as at 39 and arrange the shutter 36ª to slide across the narrow width of the plate holder opposite said aperture, but entirely independently of the shutter. For this purpose, I may provide the plate holder with a cross-bar 38ª, having a guiding groove 40, and groove the end of the plate holder as at 40ª, and provide the shutter 36ª with inturned edges 41 in order that it may readily slip in and out the plate holder along said grooves. The cross-bar 38ª will be provided with a cushion surface 39ª in contact with the exposure face of the plate to fully exclude the light upon the opening of either shutter.

After the plate is exposed with the shutters 36 or 36ª in place, the larger shutter 35 or 35ª is returned to its position in the holder; the small shutter is slipped out; the title carrying strip of translucent or transparent material is inserted in the proper manner, and then the camera is held to the sky after the lens is opened for a short while, until the desired printing is effected.

In Figs. 15 and 16, I have shown the application of my improvements to a film pack adapter omitting, however, the pack of films which is well known. In this arrangement it is not entirely practical to employ a structure like that shown in Figs. 12 and 14, for printing on the short side of the films, although it will be understood that if desired the film pack adapter frame could be so constructed. As shown in Figs. 15 and 16, this frame is built like the portion of the plate holder illustrated in Figs. 11 and 13, in which two shutters 35ᵇ and 36ᵇ are provided, with a parting or division strip 37ᵇ such as described with reference to the form of plate holder illustrated in Fig. 11, and in practice the shutters 35ᵇ and 36ᵇ are manipulated in the same manner.

In Figs. 17 and 18, I have shown other means for providing unexposed portions on the film units upon which titles may be subsequently printed; either at the side or end of the picture on the film unit, as may be desired. For this purpose, the camera is provided with a pair of sliding shutters X and Y; the shutter X being designed to cover a portion of the film unit at the narrow side of the same, while the shutter Y is designed to cover a portion of the film unit on the longer side of the same.

In the drawings, the area w, x, y, z, represents the exposure surface of a film unit, and if it is desired to conceal a portion of the same at the end, the sliding shutter X is employed. This has a short range of movement within the chamber of the camera over the exposure surface of the sensitive plate or film, with handles 42 on the outside whereby it may be moved, and adjacent the openings in the shell that will prevent light entering the camera adjacent the slide or shutter.

The shutter Y is worked from the side of the camera, and is provided with a suitable handle 42ᵃ whereby it may be pushed in and out of the chamber to cover a portion of the exposure surface of a film unit at the longer side of the same. In both instances, the title will be applied by means of an insertible card or plate upon which it is written or printed in manner illustrated and described with reference to the other forms of cameras; the shell being provided with the apertures for the insertion thereof.

In another form of structure shown in Figs. 19 and 20, I have shown folding or swinging shutters X' and Y' which may be operated when the bellows portion of the camera is extended, and designed for protecting a portion of the exposed surface of each film unit, and these shutters are hinged to rods 43 having handles 44 projecting through the shell of the camera so that they may be operated as desired. In addition, the shutter Y' which is designed to shield a portion of the unexposed surface on the longer side of the film unit is capable of longitudinal movement within the camera shell so as to be kept clear of the other shutter when the latter is operated. When the bellows portion of the camera is opened, these shutters may be readily operated. As in the other forms of camera, the title carrying member for printing upon the film is operated in the same manner as with regard to the other structures shown and described.

It will be seen, therefore, that the essential feature of my invention is the provision of means for stopping or protecting a portion of the film normally exposed for the reception of a picture, in order that such stopped portion may receive the title or other memoranda of the picture so taken, which is printed directly thereon. This stopping of the portion of the film units may be accomplished in many ways, some of which I have indicated herein, and in the use of my camera I am not limited to displaying the title or other indicating matter for the picture along the end or shorter side, but may also dispose it along the edge of the longer side by properly shifting the curtain or other obscuring or protecting means from a position that will cover the end of the film at the narrow part of the side of the film at the wide part. This, of course, is not true of the type of means shown in the box roll camera illustrated in Figs. 9 and 10, where it is necessary that the shutters or stopping means be operated from one side only.

In order that the apertures or openings in the camera case receiving the title carrying cards or other indicia may be employed without danger of admitting light to spoil portions of the film, either that upon which the picture has been exposed or that which is to receive the title, the walls of said camera are provided with spring-pressed members or fingers 28, which are suitably covered with chamois or other suitable soft fabric or leather 45; the springs being normally set to hold said covers in the closed position. The title-carrying plates 27 exactly fill the apertures provided, and they will be stiff enough to readily push away the spring fingers when entered in the camera.

It will be understood, of course, that care will be exercised in inserting the title carrier so that the title will be presented in positive form upon the finished picture printed from the titled negative.

I claim:

1. The combination with a camera having a plurality of controllable exposure apertures and within which a sensitized photographic element may be protected from light; such exposure apertures permitting portions of unit exposure areas of said sensitized element to be exposed when occupying different positions in the camera, of movable means designed to limit the size of a predetermined unit exposure area of said sensitized element and prevent exposure of a portion of the same when said sensitized element is in one exposure position.

2. The combination with a camera having a plurality of controllable exposure openings and within which a sensitized photographic element may be protected from light; such exposure openings permitting portions of unit exposure areas of said sensitized element to be exposed when occupying different positions in the camera, of movable means designed to limit the size of a predetermined unit exposure area of said sensitized element and prevent exposure of a portion of the same when said sensitized element is in one exposure position, and means for exposing said unexposed portion of the predetermined unit exposure area of said sensitized element to a second exposure opening when in another position.

3. The combination with a camera of the roll film type having a controllable exposure opening and within which a sensitized photographic element may be protected from light, of a curtain having exposure gaps and obscuring portions adapted to be moved with reference to the sensitized surface of said photographic element, and a title carrier adapted to overlie an unexposed portion of the sensitized surface of said photographic element so that a title may be printed upon the latter.

4. The combination with a camera having a controllable exposure opening and within which a sensitized photographic element may be protected from light, of a curtain having exposure gaps and obscuring portions adapted to be moved with reference to the sensitized surface of said element, a title carrier adapted to be exposed with reference to an unexposed portion of the element so that a title may be printed upon the same, and a supplemental shutter carried by the camera and operable to expose said title carrier.

5. In a camera, the combination of a shell or casing, having a controllable exposure opening and within which casing a sensitized film may be protected from light, a plurality of rollers mounted at one end of the casing, one of said rollers carrying said sensitized film and from which it may be unwound and the other roller receiving said film, an idler roller over which the film passes and whereby it may be carried across the exposure space of the camera chamber, obscuring means for a portion of said film, means for moving said obscuring means whereby the same may be disposed in different positions with respect to different portions of the film, and a title carrying member adapted to be disposed with respect to an unexposed portion of said film whereby a title may be printed thereon.

6. In a camera, the combination of a shell or casing, having a controllable exposure opening and within which casing a sensitized film may be protected from light, a plurality of rollers mounted at one end of the casing, one of said rollers carrying said film and from which it may be unwound and the other roller receiving said film, an idler roller over which the film passes and whereby it may be carried across the exposure space of the camera chamber and back over itself with its exposed surface to the rear of the camera, obscuring means for portions of said film, means for moving said obscuring means whereby the same may be disposed in different positions with respect to different portions of the sensitized surface of said film, title carrying members adapted to be disposed with respect to the unexposed portions of said film whereby the title may be printed thereon, and movable shutters to expose portions of the film to the action of light passing through said title carriers.

7. In a camera, the combination with a shell or casing having a plurality of exposure openings and within which a sensitized film may be protected from light and held in position for exposure through any one of said openings, of means within the camera permitting exposure of a portion of a predetermined unit area of said sensitized film at a front exposure opening and simultaneously stopping a portion of the sensitized surface of the film normally within the field of such front exposure opening, means for moving the film within the camera to bring the same surface of the unexposed portion of said predetermined sensitized area to a second exposure opening at the rear of the camera, and a normally closed light obstructing door controlling said rear exposure opening.

8. In a camera, the combination of a shell or casing having a plurality of exposure openings and within which casing a sensitized photographic element may be protected from light and held for exposure through any one of said openings, means within the camera casing permitting exposure of a unit portion of said film at one point and simultaneously stopping a portion of the senitized surface directly adjacent such exposure point, means for moving the film within the camera to bring the same surface of the unexposed part of said unit portion to a second exposure point, a title carrying member adapted to overlie said unexposed portion at the second exposure point, and a light obstructing door adapted to be opened at said second exposure point for action upon the initially unexposed portion of said film.

9. In a camera, the combination of a casing having a controllable exposure opening and within which casing a sensitized photographic element may be protected from light; said casing having the usual lens exposure chamber and an auxiliary exposure opening at the back of the same, of a plurality of doors at right angles to each other for closing said auxiliary opening; one of said doors arranged to open in two positions.

10. The combination with a camera having a controllable exposure opening and within which camera a sensitized film made up of independent unit spaces may be protected from light, of means for obscuring a portion of the surface of a unit space while exposing the rest of the same in one position within the camera, means for moving the film to bring said unit space to another position where the unexposed surface portion of the same may be exposed, and means permitting exposure of the original unexposed portion of the same surface of said film unit at a second exposure point and from a direction opposite the original exposure of said unit space.

11. The combination with a camera having a controllable exposure opening and within which camera a sensitized film made up of units of predetermined area may be disposed and protected from light, of a carrier therefor, means for moving the carrier, a curtain for permitting exposure of the surface of one portion of a predetermined unit area of the sensitized element under one condition while a second portion of the surface of such unit is obscured, and permitting exposure of the same surface of said second portion of said unit at another exposure opening while the first portion is obscured, and means for moving said curtain.

12. The combination with a camera having a plurality of controllable exposure openings and within which camera a sensitized photographic element is movably mounted and protected from light, of means for independently controlling said exposure openings for exposure at different times of different portions of the same surface of a unit area or space of said sensitized element, and means for moving said sensitized element between said exposure openings.

13. The combination with a camera having a plurality of controllable exposure openings and within which camera a sensitized photographic element is movably mounted and protected from light, of means for independently controlling said exposure openings for exposure at different times of different portions of the same surface of a unit area or space of said sensitized element, and an independent title carrier for interposition between a source of light and said sensitized element at one of said exposure openings.

14. The combination with a camera casing within which a sensitized photographic element is movably mounted and protected from light; said casing having exposure apertures at front and rear of the same, of means for delimiting the exposure area of a predetermined unit portion of said sensitized element when the latter is in one position and permitting exposure of such portion when said sensitized element is in another position, and means for moving the sensitized element between said positions; the same surface of the sensitized element being subjected to the successive exposures.

15. The combination with a camera casing within which a sensitized photographic element may be movably mounted and protected from light; said casing having exposure apertures at front and rear of the same, of means for preventing exposure of a part of the surface of a predetermined unit portion of said sensitized element when the latter is in one position, and permitting exposure of such previously protected part of such unit portion when the sensitized element is in another position, and means for moving said predetermined unit portion of the sensitized element between said exposure positions.

16. The combination with the casing of a camera having a controllable exposure opening and within which a sensitized photographic element may be protected from light; said casing having an exposure chamber for defining predetermined exposure areas upon said sensitized element, of a movable curtain for delimiting portions of said exposure areas for subsequent printing whereby the predetermined unit areas or spaces of the latter may be exposed or protected as desired, and means for moving said sensitized element to bring the respective exposure areas into exposure position at another point of the camera.

17. In a camera having a controllable exposure opening and within which a sensitized photographic element may be protected from light, the combination with a casing having the usual lens exposure chamber and an auxiliary exposure opening at the back of said casing, of a plurality of doors disposed at right angles to each other for closing said casing opening; one of said doors being arranged to open in two positions.

18. The combination with a camera casing having a controllable exposure opening and within which a sensitized photographic element may be protected from light, of a movable curtain for controlling the exposure of portions of predetermined unit areas of said sensitized element.

19. The combination with a camera casing having a controllable exposure opening and within which a sensitized photographic element may be protected from light; said element being movable within the camera casing and providing a plurality of exposure units of predetermined area, of a movable curtain having transparent and opaque portions for limiting the exposure surface of a predetermined unit portion of said sensitized element while an exposure is being made with said predetermined unit portion in one position in the camera, means for moving the sensitized element to bring said exposure unit to a second exposure position, and means for shifting said curtain.

20. The combination with a camera having a controllable exposure opening and within which a sensitized photographic element may be protected from light; said element being movable within the camera, of means within the camera and operable from the exterior of the same for preventing exposure of portions of unit areas of said sensitized element when disposed at one point, means for moving said sensitized element to bring the unexposed portion to a second exposure point, a supplemental shutter closing said second exposure point, and a title plate for insertion in the camera at said second exposure point whereby the opening of the supplemental shutter will effect an exposure of the title upon the unexposed portion of the originally exposed unit section.

21. The combination with a camera casing having a controllable exposure opening and within which a sensitized photographic element movably mounted may be protected from light, of means for guiding said element in a plurality of parallel runs, said camera having exposure openings oppositely disposed with respect to each other whereby the same surface of portions of predetermined unit area of the sensitized surface of the film may receive images from opposite sides of the camera casing.

22. The combination with a camera casing having a controllable exposure opening and within which a sensitized photographic element movably mounted may be protected from light, of means for guiding said element in a plurality of parallel runs, said camera having exposure openings oppositely disposed with respect to each other and out of alinement whereby different portions of the same surface of predetermined unit areas of the sensitized film may receive images from opposite sides of the camera casing.

23. The combination with a camera casing having a controllable exposure opening and within which casing a sensitized photographic element may be protected from light; said element having a predetermined unit exposure area, of removable means for limiting the size of an exposure upon a predetermined unit area; such means protecting the sensitized surface, and means for introducing a title-carrying element whereby printing of such title upon the sensitized surface of the film may be effected directly adjacent the previously exposed portion of said sensitized surface.

24. The combination with a camera casing having a controllable exposure opening and within which casing a sensitized photographic element may be protected from light; said element having a predetermined unit exposure area, of removable means for limiting the size of an exposure upon a predetermined unit area; such means protecting a portion of the sensitized surface of said predetermined unit area, and means for introducing a title-carrying element whereby printing of such title upon a portion of the sensitized surface of said predetermined unit area of the film may be effected directly adjacent the previously exposed portion of said sensitized surface.

25. A camera having the usual lens opening for the exposure of an image upon a sensitized film, and a second exposure aperture in its rear wall without a lens, in combination with means for moving the sensitized element between the exposure openings whereby unit portions of the same surface may be successively exposed.

26. A camera having the usual lens opening for the exposure of an image upon a sensitized film, and a second exposure aperture in its rear wall without a lens and out of alinement with said lens opening, in combination with means for moving the sensitized element between the exposure openings whereby different portions of predetermined unit areas of the same surface of said sensitized element may be successively exposed.

27. The combination with a camera within which a sensitized photographic element may be protected from light; said element being movable within the camera, of a casing having exposure openings at different positions with respect to the movable sensitized element whereby portions of the same predetermined unit area or space of said sensitized element may be exposed different times; one portion of the sensitized element being exposed at one time and the balance of said predetermined area of the element being exposed at the second exposure opening, means for moving said sensitized element between said exposure positions, and an independent title carrier for printing upon the film and adapted for interposition between a source of light and said sensitized element at one of said exposure openings.

HARVEY L. BOYER.